(12) United States Patent
Wu et al.

(10) Patent No.: US 11,157,716 B2
(45) Date of Patent: Oct. 26, 2021

(54) MULTI-SENSOR-BASED UNDER-SCREEN FINGERPRINT CAPTURING METHOD AND SYSTEM AND ELECTRONIC DEVICE

(71) Applicant: SHENZHEN GOODIX TECHNOLOGY CO., LTD., Shenzhen (CN)

(72) Inventors: Dan Wu, Shenzhen (CN); Rongying Hu, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/833,505

(22) Filed: Mar. 27, 2020

(65) Prior Publication Data
US 2020/0226344 A1 Jul. 16, 2020

Related U.S. Application Data

(63) Continuation of application No. PCT/CN2018/107389, filed on Sep. 25, 2018.

(51) Int. Cl.
*G06K 9/00* (2006.01)
*G06F 3/044* (2006.01)

(52) U.S. Cl.
CPC ....... *G06K 9/0004* (2013.01); *G06K 9/00013* (2013.01); *G06F 3/044* (2013.01); *G06K 9/00006* (2013.01)

(58) Field of Classification Search
CPC ............. G09K 6/00006; G09K 6/0004; G09K 6/00013
See application file for complete search history.

(56) References Cited

U.S. PATENT DOCUMENTS

| 2014/0341446 | A1 | 11/2014 | Hare et al. | |
| 2017/0046558 | A1* | 2/2017 | Li | G06K 9/0002 |
| 2017/0140201 | A1 | 5/2017 | Li et al. | |
| 2017/0193272 | A1* | 7/2017 | Kim | G06K 9/00087 |

(Continued)

FOREIGN PATENT DOCUMENTS

| CN | 105184228 A | 12/2015 |
| CN | 106446786 A | 2/2017 |

(Continued)

*Primary Examiner* — Joseph R Haley
(74) *Attorney, Agent, or Firm* — Scully Scott Murphy & Presser

(57) ABSTRACT

Provided are a multi-sensor-based under-screen fingerprint capturing method and system and an electronic device, where the method is applied to an under-screen fingerprint capturing system including multiple fingerprint sensors, and includes: acquiring fingerprint information of a user captured by the multiple fingerprint sensors, where each fingerprint sensor corresponds to a sensing region, and sensing regions corresponding to the multiple fingerprint sensors form a fingerprint capturing region of the under-screen fingerprint capturing system; and determining an effectively pressed fingerprint sensor among the multiple fingerprint sensors according to the fingerprint information of the user, where the fingerprint information of the user captured by the effectively pressed fingerprint sensor is used for fingerprint authentication of the user.

18 Claims, 4 Drawing Sheets

200

Acquiring fingerprint information of a user captured by the multiple fingerprint sensors, where each fingerprint sensor corresponds to a sensing region, and sensing regions corresponding to the multiple fingerprint sensors form a fingerprint capturing region of the under-screen fingerprint capturing system — S210

Determining an effectively pressed fingerprint sensor among the multiple fingerprint sensors according to the fingerprint information of the user, where the fingerprint information of the user captured by the effectively pressed fingerprint sensor is used for fingerprint authentication of the user — S220

(56) References Cited

U.S. PATENT DOCUMENTS

2017/0270342 A1 9/2017 He et al.
2017/0344787 A1 11/2017 Cho et al.

FOREIGN PATENT DOCUMENTS

| CN | 106527956 A | 3/2017 |
| CN | 106991387 A | 7/2017 |
| CN | 107194224 A | 9/2017 |
| CN | 107368221 A | 11/2017 |
| CN | 108235750 A | 6/2018 |

\* cited by examiner

200

| Acquiring fingerprint information of a user captured by the multiple fingerprint sensors, where each fingerprint sensor corresponds to a sensing region, and sensing regions corresponding to the multiple fingerprint sensors form a fingerprint capturing region of the under-screen fingerprint capturing system | S210 |

↓

| Determining an effectively pressed fingerprint sensor among the multiple fingerprint sensors according to the fingerprint information of the user, where the fingerprint information of the user captured by the effectively pressed fingerprint sensor is used for fingerprint authentication of the user | S220 |

FIG. 2

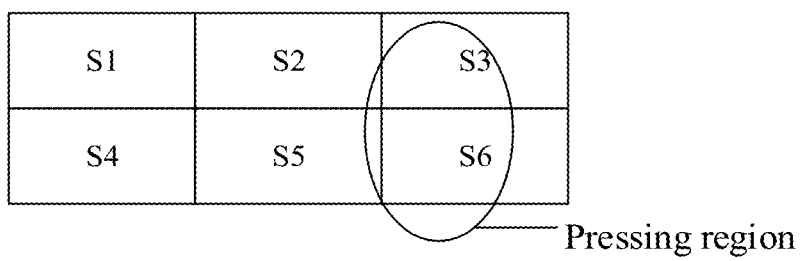

Pressing region

FIG. 3

MULTI-SENSOR-BASED UNDER-SCREEN FINGERPRINT CAPTURING METHOD AND SYSTEM AND ELECTRONIC DEVICE

CROSS-REFERENCE TO RELATED APPLICATIONS

This application is a continuation of International Application No. PCT/CN2018/107389, filed on Sep. 25, 2018, the disclosure of which is hereby incorporated by reference in its entirety.

TECHNICAL FIELD

The present application relates to the technical field of fingerprints, and more particularly to a multi-sensor-based under-screen fingerprint capturing method and system and an electronic device.

BACKGROUND

An under-screen fingerprint identification apparatus may be built into a display screen of a mobile phone without constraint by a specific size, and could realize a large area of fingerprint identification, which is equivalent to increasing a length of a password and improving security of fingerprint identification. However, the large area of fingerprint identification requires longer fingerprint matching time, resulting in larger power consumption of a terminal device and affecting user experience.

SUMMARY

Embodiments of the present application provide a multi-sensor-based under-screen fingerprint capturing method and system and an electronic device, which is beneficial to reducing power consumption of a terminal.

In a first aspect, provided is a multi-sensor-based under-screen fingerprint capturing method, applied to an under-screen fingerprint capturing system including multiple fingerprint sensors, where the method includes:
acquiring fingerprint information of a user captured by the multiple fingerprint sensors, where each fingerprint sensor corresponds to a sensing region, and sensing regions corresponding to the multiple fingerprint sensors form a fingerprint capturing region of the under-screen fingerprint capturing system; and determining an effectively pressed fingerprint sensor among the multiple fingerprint sensors according to the fingerprint information of the user, where the fingerprint information of the user captured by the effectively pressed fingerprint sensor is used for fingerprint authentication of the user.

In some possible implementation manners, the determining the effectively pressed fingerprint sensor among the multiple fingerprint sensors according to the fingerprint information of the user includes:
determining a pressing region for the user on the sensing region of the each fingerprint sensor of the multiple fingerprint sensors according to the fingerprint information of the user; and
determining the effectively pressed fingerprint sensor among the multiple fingerprint sensors according to the pressing region for the user on the sensing region of the each fingerprint sensor.

In some possible implementation manners, the determining the pressing region for the user on the sensing region of the each fingerprint sensor of the multiple fingerprint sensors according to the fingerprint information of the user includes:
determining a variance of sampling values of each pixel point or a magnitude of a sampling value of each pixel point in the fingerprint information of the user; and
determining the pressing region on the sensing region of the each fingerprint sensor according to the variance of the sampling values of the each pixel point or the magnitude of the sampling value of the each pixel point.

In some possible implementation manners, the determining the pressing region on the sensing region of the each fingerprint sensor according to the variance of the sampling values of the each pixel point or the magnitude of the sampling value of the each pixel point includes:
determining a region formed by pixel points with a variance greater than a first variance threshold in the each fingerprint sensor as the pressing region for the user on the sensing region of the each fingerprint sensor; or determining a region formed by pixel points with a sampling value greater than a first sampling threshold in the each fingerprint sensor as the pressing region for the user on the sensing region of the each fingerprint sensor.

In some possible implementation manners, the determining the effectively pressed fingerprint sensor among the multiple fingerprint sensors according to the pressing region for the user on the sensing region of the each fingerprint sensor includes:
determining a fingerprint sensor corresponding to a pressing region having an area larger than a first threshold in the pressing regions on the sensing regions of the fingerprint sensors as the effectively pressed fingerprint sensor.

In some possible implementation manners, the method further includes:
determining a number threshold of the effectively pressed fingerprint sensor according to a security level of a first operation of triggering fingerprint capturing and a first correspondence relationship, where the first correspondence relationship is a correspondence relationship between a security level and a number threshold of the effectively pressed fingerprint sensor.

In some possible implementation manners, the determining the effectively pressed fingerprint sensor among the multiple fingerprint sensors according to the pressing region for the user on the sensing region of the each fingerprint sensor includes:
determining the effectively pressed fingerprint sensor among the multiple fingerprint sensors according to the pressing region for the user on the sensing region of the each fingerprint sensor in combination with the number threshold of the effectively pressed fingerprint sensor.

In some possible implementation manners, the determining the effectively pressed fingerprint sensor among the multiple fingerprint sensors according to the pressing region for the user on the sensing region of the each fingerprint sensor in combination with the number threshold of the effectively pressed fingerprint sensor includes:
determining K largest pressing region(s) in the pressing regions on the sensing regions of the fingerprint sensors, where K is the number threshold of the effectively pressed fingerprint sensor corresponding to the security level of the first operation;
determining L pressing region(s) having an area larger than a second threshold in the K pressing region(s), where L is a positive integer and L is less than or equal to K; and
determining L fingerprint sensor(s) corresponding to the L pressing region(s) as the effectively pressed fingerprint sensor(s).

In some possible implementation manners, in the first correspondence relationship, a first security level corresponds to N fingerprint sensors, a second security level corresponds to M fingerprint sensor(s), and the first security level is higher than the second security level, where N and M are positive integers, and N is greater than M.

In some possible implementation manners, M is a number of fingerprint sensors against which a single finger is able to be pressed, and N is a number of fingerprint sensors against which at least two fingers are able to be pressed.

In some possible implementation manners, the method further includes:

sending the fingerprint information of the user captured by the effectively pressed fingerprint sensor to a processor of an electronic device, if a number of the effectively pressed fingerprint sensors is greater than zero.

In some possible implementation manners, the method further includes:

performing fingerprint authentication according to the fingerprint information of the user captured by the effectively pressed fingerprint sensor.

In a second aspect, provided is a multi-sensor-based under-screen fingerprint capturing system, including:

multiple fingerprint sensors, configured to capture fingerprint information of a user, where each fingerprint sensor corresponds to a sensing region, and sensing regions corresponding to the multiple fingerprint sensors form a fingerprint capturing region of the under-screen fingerprint capturing system; and a processing unit, configured to acquire the fingerprint information of the user captured by the multiple fingerprint sensors, and determine an effectively pressed fingerprint sensor among the multiple fingerprint sensors according to the fingerprint information of the user, where the fingerprint information of the user captured by the effectively pressed fingerprint sensor is used for fingerprint authentication of the user.

In some possible implementation manners, the processing unit is configured to:

determine a pressing region for the user on the sensing region of the each fingerprint sensor of the multiple fingerprint sensors according to the fingerprint information of the user; and determine the effectively pressed fingerprint sensor among the multiple fingerprint sensors according to the pressing region for the user on the sensing region of the each fingerprint sensor.

In some possible implementation manners, the processing unit is further configured to:

determine a variance of sampling values of each pixel point or a magnitude of a sampling value of each pixel point in the fingerprint information of the user; and determine the pressing region on the sensing region of the each fingerprint sensor according to the variance of the sampling values of the each pixel point or the magnitude of the sampling value of the each pixel point.

In some possible implementation manners, the processing unit is further configured to:

determine a region formed by pixel points with a variance greater than a first variance threshold in the each fingerprint sensor as the pressing region for the user on the sensing region of the each fingerprint sensor; or determine a region formed by pixel points with a sampling value greater than a first sampling threshold in the each fingerprint sensor as the pressing region for the user on the sensing region of the each fingerprint sensor.

In some possible implementation manners, the processing unit is further configured to:

determine a fingerprint sensor corresponding to a pressing region having an area larger than a first threshold in the pressing regions on the sensing regions of the fingerprint sensors as the effectively pressed fingerprint sensor.

In some possible implementation manners, the processing unit is further configured to:

determine a number threshold of the effectively pressed fingerprint sensor according to a security level of a first operation of triggering fingerprint capturing and a first correspondence relationship, where the first correspondence relationship is a correspondence relationship between a security level and a number threshold of the effectively pressed fingerprint sensor.

In some possible implementation manners, the processing unit is further configured to:

determine the effectively pressed fingerprint sensor among the multiple fingerprint sensors according to the pressing region for the user on the sensing region of the each fingerprint sensor in combination with the number threshold of the effectively pressed fingerprint sensor.

In some possible implementation manners, the processing unit is further configured to:

determine K largest pressing region(s) in the pressing regions on the sensing regions of the fingerprint sensors, where K is the number threshold of the effectively pressed fingerprint sensor corresponding to the security level of the first operation;

determine L pressing region(s) having an area larger than a second threshold in the K pressing region(s), where L is a positive integer and L is less than or equal to K; and determine L fingerprint sensor(s) corresponding to the L pressing region(s) as the effectively pressed fingerprint sensor(s).

In some possible implementation manners, in the first correspondence relationship, a first security level corresponds to N fingerprint sensors, a second security level corresponds to M fingerprint sensor(s), and the first security level is higher than the second security level, where N and M are positive integers, and N is greater than M.

In some possible implementation manners, M is a number of fingerprint sensors against which a single finger is able to be pressed, and N is a number of fingerprint sensors against which at least two fingers are able to be pressed.

In some possible implementation manners, the processing unit is a micro control unit (MCU) in a fingerprint module or a processor in an electronic device.

In some possible implementation manners, the processing unit is further configured to:

perform fingerprint authentication according to the fingerprint information of the user captured by the effectively pressed fingerprint sensor.

In some possible implementation manners, the processing unit is the MCU in the fingerprint module, and the processing unit is further configured to send the fingerprint information of the user captured by the effectively pressed fingerprint sensor to the processor of the electronic device.

In a third aspect, provided is a chip, including an input and output interface, at least one processor, at least one memory and a bus, where the at least one memory is configured to store an instruction, and the at least one processor is configured to call the instruction in the at least one memory, to execute the method in the first aspect or any possible implementation manner of the first aspect.

In a fourth aspect, provided is an electronic device including the under-screen fingerprint capturing system according to the second aspect or any possible implementation manner of the second aspect.

In a fifth aspect, provided is an electronic device including the chip according to the third aspect.

In a sixth aspect, provided is a computer readable medium, configured to store a computer program, where the computer program includes instructions used to execute the method in the first aspect or any possible implementation manner of the first aspect.

In a seventh aspect, provided is a computer program product including instructions that when a computer runs the instructions of the computer program product, the computer executes the under-screen fingerprint capturing method in the forgoing first aspect or any possible implementation manner of the first aspect.

Specifically, the computer program product may be run on the electronic device of the foregoing fourth aspect to the fifth aspect.

Therefore, according to a fingerprint identification solution in an embodiment of the present application, an effectively pressed fingerprint sensor among multiple fingerprint sensors may be determined according to fingerprint information of a user captured by the multiple fingerprint sensors. During fingerprint identification, fingerprint matching is performed only according to the fingerprint information captured by the effectively pressed fingerprint sensor, which is beneficial to reducing power consumption of a terminal device and improving speed of fingerprint identification.

BRIEF DESCRIPTION OF THE DRAWINGS

FIG. 2 is a schematic flowchart of a multi-sensor-based under-screen fingerprint capturing method according to an embodiment of the present application.

FIG. 3 is a schematic diagram of an example of determining an effectively pressed fingerprint sensor.

DESCRIPTION OF EMBODIMENTS

Technical solutions of the present application are described below in combination with accompanying drawings.

Embodiments of the present application may be applied to a fingerprint system, including but not limited to an optical, ultrasonic or other fingerprint identification system and a medical diagnostic product based on optical, ultrasonic or other fingerprint imaging. The embodiments of the present application are only described by an example of an optical fingerprint system, which should not constitute any limitation to the embodiments of the present application, and the embodiments of the present application are also applicable to other systems using an optical, ultrasonic or other imaging technology or the like. It should be understood that, in addition to fingerprint identification, the technical solutions of the present application may perform other biometric identification, such as palmprint identification, iris identification, face identification or the like, which is not limited in the embodiments of the present application.

As an electronic device enters an era of full screen, a fingerprint capturing region on the front of the electronic device is squeezed by the full screen, and therefore, under-display or under-screen fingerprint identification technology has gained an increasing attention. The under-screen fingerprint identification technology refers to mounting a fingerprint identification module under a display screen, so as to realize a fingerprint identification operation in a display region of the display screen without setting a fingerprint capturing region in a region other than the display region on the front of an electronic device.

Optical under-screen fingerprint identification technology uses light returned from a top surface of a display component of a device for fingerprint sensing and other sensing operations. The returned light carries information of an object (such as a finger) in contact with the top surface, and by capturing and detecting the returned light, a particular optical sensor module under a display screen is implemented. The optical sensor module may be designed to achieve desired optical imaging by properly configuring optical elements for capturing and detecting the returned light.

It should be understood that technical solutions of embodiments of the present application may be applied to various electronic devices, for example, portable or mobile computing devices such as smart phones, notebook computers, tablet computers and game devices, and other electronic devices such as electronic databases, automobiles and automated teller machines (ATM), which is not limited in the embodiments of the present application.

Figure 1A:
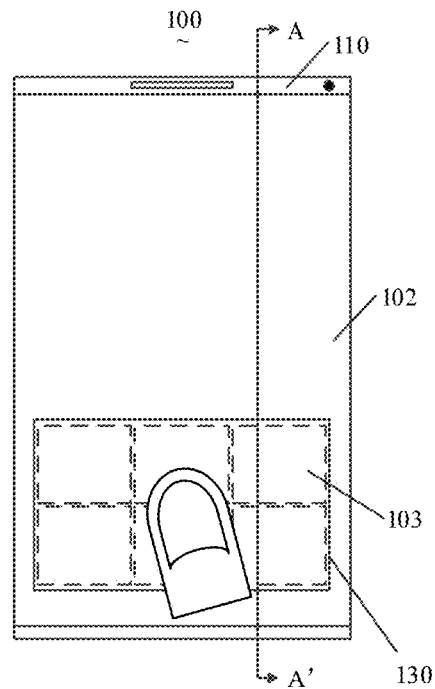
FIG. 1A is an oriented diagram of an electronic device according to an embodiment of the present application.
Figure 1B:
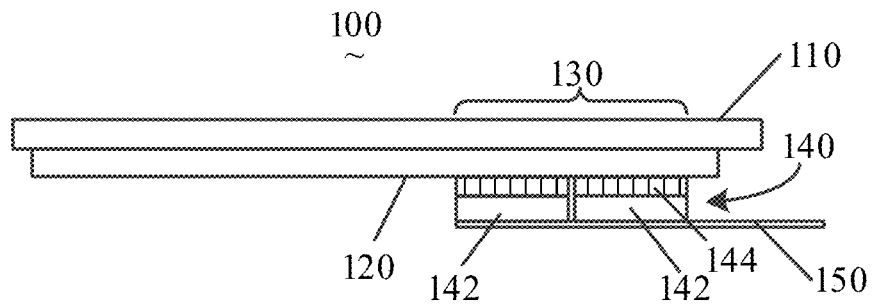
FIG. 1B is a partial schematic cross-sectional structural diagram of the electronic device shown in FIG. 1A taken along A-A'.

FIG. 1 is a schematic diagram of an electronic device 100 to which a fingerprint identification apparatus is applicable. FIG. 1A is a schematic front diagram of an electronic device 100, and FIG. 1B is a partial schematic cross-sectional structural diagram of the electronic device 100 shown in FIG. 1A taken along A-A'.

As shown in FIG. 1, the electronic device 100 may include a display screen 120 and a fingerprint identification module 140; and the display screen 120 has a display region 102, and the fingerprint identification module 140 is disposed under the display screen 120.

The display screen 120 may be a self-emitting display screen that employs a self-emitting display unit as a display pixel. For example, the display screen 120 may be an organic light-emitting diode (OLED) display screen or a micro light-emitting diode (Micro-LED) display screen. In other alternative embodiments, the display screen 120 may also be a liquid crystal display (LCD) screen or other passive light-emitting display screens, which is not limited in the embodiments of the present application.

On the other hand, the display screen 120 may be a touch display screen for example, which may not only perform image display, but also detect a touch or press operation of a user, thereby providing the user with a human-machine interaction interface. For example, in an embodiment, the electronic device 100 may include a touch sensor, and the touch sensor may be specifically a touch panel (TP), which may be disposed on a surface of the display screen 120, or may be partially or wholly integrated into the display screen 120 to form the touch display screen.

The fingerprint identification module 140 may be specifically an optical fingerprint identification module, and is mainly used for capturing fingerprint information (such as fingerprint image information) of a user. In an embodiment of the present application, the fingerprint identification module 140 may be disposed at least in a partial area under the display screen 120 such that a fingerprint capturing area (or sensing area) 130 of the fingerprint identification module 140 is at least partially located in the display region 102 of the display screen 120. Here, an area of the fingerprint capturing region 130 may be different from that of the fingerprint identification module 140, for example, the area of the fingerprint capturing region 130 of the fingerprint identification module 140 may be allowed to be larger than that of the fingerprint identification module 140 by an optical path design such as lens imaging, reflective folding, or other light convergence or reflection. In other alternative implementation manners, if an optical path is directed, for example, by a light collimation method, the area of the fingerprint capturing region 130 of the fingerprint identification module 140 may also be designed to be identical with that of the fingerprint identification module 140.

As an embodiment, the fingerprint identification module 140 may specifically include multiple optical fingerprint sensors 142 (hereinafter also referred to as sensor chips) having optical sensing arrays; and the multiple optical fingerprint sensors 142 may be disposed side by side under the display screen 120. Each of the optical fingerprint sensors 142 includes multiple optical sensing units, respectively, and regions in which the optical sensing arrays are located correspond to sensing regions 103 of the optical fingerprint sensors in which the optical sensing arrays are located. The sensing regions of the multiple optical fingerprint sensors together constitute the fingerprint capturing region 130 of the fingerprint identification module 140. That is, the fingerprint capturing region 130 of the fingerprint identification module 140 may include multiple sub-regions, each of which corresponds to the sensing region of one of the optical fingerprint sensors or the optical sensing arrays, respectively. As shown in FIG. 1A, the fingerprint capturing region 130 is located in the display region 102 of the display screen 120. Since the multiple optical fingerprint sensors are adopted to be disposed in the side by side manner, the fingerprint capturing region 130 of the fingerprint identification module 140 may be extended to a main region in the lower half part of the display region 102, that is, to a customary pressing region of a finger, thereby implementing a blind-press type fingerprint input operation. In other alternative embodiments, when the number of the optical fingerprint sensors is sufficient, the fingerprint capturing region 130 may be further extended to half of or even the whole display region, thereby implementing half screen or full screen fingerprint detection. Therefore, when a user needs to unlock the electronic device 100 or perform other fingerprint verification, a fingerprint input operation may be implemented merely by pressing a finger on the fingerprint capturing region 130 in the display screen 120. Since fingerprint capturing and detection may be implemented within the display region 102 of the display screen 120, a front face of the electronic device 100 adopted the foregoing structure does not need to specially reserve space to set a fingerprint button (such as a Home button), so that it is possible that a full screen solution may be adopted. Therefore, the display region 102 of the display screen 120 could be substantially extended to the whole front face of the electronic device 100.

In a specific embodiment, the multiple optical fingerprint sensors 142 of the fingerprint identification module 140 may be independently encapsulated sensor chips, or may be manufactured into multiple dies and encapsulated in the same chip encapsulant, or may further be manufactured in different regions of the same die by a semiconductor process. On the other hand, the optical fingerprint sensors 142 may also include a readout circuit and/or other auxiliary circuits electrically connected to the sensing arrays in addition to the optical sensing arrays as described above. As an optional implementation manner, as shown in FIG. 1B, an optical path modulator 144 may further be disposed above the optical fingerprint sensor 142. As an example, the optical path modulator 144 may be attached to the sensing arrays of the optical fingerprint sensors 142 as an independent optical component, or integrated into the chip of the optical fingerprint sensors 142 by a semiconductor process, thereby implementing the ultra-thin fingerprint identification module 140. Specifically, the optical path modulator 144 may be an optical collimator having an array of through holes with a high aspect ratio, and is mainly used for collimating, modulating, and imaging downwardly propagating fingerprint detection light, so that reflected light from a finger surface is directed to the sensing arrays for optical detection to acquire fingerprint image information.

Optionally, corresponding to the multiple optical fingerprint sensors 142 of the fingerprint identification module 140, the optical path modulator 144 may be plural, and each optical path modulator 144 corresponds to an optical fingerprint sensor respectively, and is respectively attached to the corresponding optical fingerprint sensor 142. Alternatively, the multiple optical fingerprint sensors 142 may also share one entire optical path modulator 144, that is, the optical path modulator 144 has an area large enough to cover the sensing arrays of the multiple optical fingerprint sensors 142. In addition, other optical components, for example, a filter or other optical films, may be further disposed between the optical path modulator 144 and the optical fingerprint sensor 142 or between the display screen 120 and the optical path modulator 144, and are mainly used to isolate the impact of external interference light on optical fingerprint detection. The filter may be used to filter out ambient light that penetrates a finger and enters into the optical fingerprint sensors 142 via the display screen 120. Similar to the optical path modulator 144, the filter may be respectively disposed on each of the optical fingerprint sensors 142 to filter out interference light, or a large-area filter may also be used to cover the multiple optical fingerprint sensors 142 simultaneously.

Alternatively, the optical path modulator 144 may also be replaced by an optical lens, and pinholes may be formed by a light-shielding material above the optical lens to cooperate with the optical lens to converge fingerprint detection light to the optical fingerprint sensors 142 under the optical lens, thereby achieving fingerprint imaging. Similarly, each of the optical fingerprint sensors 142 may be respectively configured with an optical lens for fingerprint imaging, or the multiple optical fingerprint sensors 142 may also utilize the same optical lens to achieve light convergence and fingerprint imaging. In other alternative embodiments, each of the optical fingerprint sensors 142 may even further have dual sensing arrays (Dual-Array) or multiple sensing arrays (Multi-Array), and two or more optical lenses are configured to cooperate with the dual or multiple sensing arrays for optical imaging so as to reduce imaging distance and enhance imaging effect.

In an embodiment of the present application, the display screen 120 adopting an OLED display screen is taken as an example, a light-emitting layer of the display screen 120 has OLED display unit arrays distributed in an array, and the fingerprint identification module 140 may utilize an OLED display unit (that is, an OLED light source) of the OLED display screen 120 that is located in the fingerprint capturing region 130 as an excitation light source for fingerprint detection and identification. Of course, it should be understood that in other alternative implementations, the fingerprint identification module 140 may also provide an optical signal for fingerprint detection and identification by adopting a built-in light source or an external light source. In this case, an under-screen fingerprint identification apparatus can be not only applied to a self-emitting display screen such as an OLED display screen, but also applied to a non-self-emitting display screen such as a liquid crystal display screen or other passive light-emitting display screens. For example, in the case of application to a liquid crystal display screen having a backlight module and a liquid crystal panel, in order to support under-screen fingerprint detection of the liquid crystal display screen, an excitation light source for optical fingerprint detection may further be included, and the excitation light source may be specifically an infrared light source or a light source at a specific invisible light wavelength. As an example, the infrared light source may be disposed under the backlight module of the liquid crystal display screen or disposed in an edge region under a protective cover of the electronic device 100, while the fingerprint identification module 140 is disposed under the backlight module, and the backlight module allows light for fingerprint detection to pass through the liquid crystal panel and the backlight module and reach the optical fingerprint sensors of the fingerprint identification module 140 by providing a hole on film layers such as a diffusion sheet, a brightness enhancement sheet, a reflection sheet, or the like or by performing other optical designs.

Moreover, the optical sensing array of the fingerprint identification module 140 may be specifically a photo detector array (or referred to as a photodetector array) that includes multiple photo detectors distributed in an array, and the photo detectors may serve as the optical sensing units as described above. A micro lens may be further formed above the photo detectors to improve an imaging effect of a fingerprint image.

When a finger touches, is pressed against, or approaches (collectively referred to as pressing for convenience of description) the fingerprint capturing region 130, light emitted by the display unit of the fingerprint capturing region 130 or an additionally provided excitation source for fingerprint detection is reflected by the finger to form reflected light that may carry fingerprint information of the finger of a user. For example, after the light is reflected by a fingerprint on the surface of the user's finger, the reflected light carries fingerprint information of the user, because the reflected light of a finger fingerprint ridge is different from that of a finger fingerprint valley. The reflected light is returned to the display screen 120, received by the photo detector array of the fingerprint identification module 140 under the display screen 120, and converted into a corresponding electrical signal, that is, a fingerprint detection signal. The electronic device 100 may acquire fingerprint information of the user based on the fingerprint detection signal, and may further perform fingerprint matching verification, thereby completing identity verification of the current user so as to confirm whether the user has permission to perform a corresponding operation on the electronic device 100.

It should be understood that in a specific implementation, the electronic device 100 further includes a protective cover 110, the protective cover 110 may be specifically a transparent cover such as a glass cover or a sapphire cover which is located on the display screen 120 and covers a front face of the electronic device 100, and the surface of the protective cover 110 may also be provided with a protective layer. Therefore, in an embodiment of the present application, the so-called finger being pressed against the display screen 120 may actually refer to the finger being pressed against the cover 110 on the display screen 120 or a surface of the protective layer covering the cover 110.

On the other hand, a circuit board 150, for example, a flexible printed circuit (FPC), may be further provided under the fingerprint identification module 140. The fingerprint identification module 140 may be soldered to the circuit board 150 through a pad, and achieve electrical interconnection and signal transmission with other peripheral circuits or other elements of the electronic device 100 through the circuit board 150. For example, the fingerprint identification module 140 may receive a control signal of a processing unit of the electronic device 100 through the circuit board 150, and may also output the fingerprint detection signal to the processing unit, a control unit or the like of the electronic device 100 through the circuit board 150.

It should be understood that in the embodiment of the present application, the sensing array in the optical fingerprint apparatus may also be referred to as an image sensor (Sensor) or a photo sensor, and a DIE may be manufactured by semiconductor processing, that is, the DIE includes the image sensor.

It should also be understood that the optical fingerprint apparatus in the embodiment of the present application may also be referred to as an optical fingerprint identification module, a fingerprint apparatus, a fingerprint identification apparatus, a fingerprint identification module, a fingerprint module, a fingerprint capturing apparatus, or the like.

FIG. 2 is a schematic flowchart of an under-screen fingerprint capturing method 200 according to an embodiment of the present application. The method 200 may be applied to a multi-fingerprint-sensor-based under-screen fingerprint capturing system. As shown in FIG. 2, the method 200 includes:

S210, acquiring fingerprint information of a user captured by the multiple fingerprint sensors, where each fingerprint sensor corresponds to a sensing region, and sensing regions corresponding to the multiple fingerprint sensors form a fingerprint capturing region of the under-screen fingerprint capturing system; and S220, determining an effectively pressed fingerprint sensor among the multiple fingerprint sensors according to the fingerprint information of the user, where the fingerprint information of the user captured by the effectively pressed fingerprint sensor is used for fingerprint authentication of the user.

Optionally, in some embodiments, the under-screen fingerprint capturing system may be disposed in a fingerprint module, or the fingerprint capturing system may be the fingerprint module, or the fingerprint capturing system may include the fingerprint module.

Optionally, in other embodiments, the under-screen fingerprint capturing system may also be disposed in an electronic device, or the fingerprint capturing system may also be the electronic device.

Optionally, in the embodiment of the present application, the method 200 may be performed by a processing unit in the under-screen fingerprint capturing system. Specifically, a function performed by the processing unit may be performed by a micro control unit (MCU) of a fingerprint module, or performed by a processor of an electronic device, or commonly performed by the MCU of the fingerprint module and the processor of the electronic device.

It should be understood that the fingerprint sensors in the embodiment of the present application may correspond to the optical fingerprint sensors 142 in FIG. 1. Each fingerprint sensor corresponds to a sensing region, the sensing region of the each fingerprint sensor may be understood as a region of the each fingerprint sensor for fingerprint detection (or fingerprint capturing), and the sensing regions of the each fingerprint sensor of the multiple fingerprint sensors are combined to form a fingerprint detection region of the fingerprint capturing system, which may be used to achieve a large area of fingerprint capturing, for example, fingerprint capturing of multiple fingers. The multiple fingerprint sensors may be disposed in a fingerprint module, and the fingerprint module may correspond to the fingerprint identification module 140 in FIG. 1 and may be disposed under the display screen.

Hereinafter, a fingerprint capturing method in an embodiment of the present application is described with a fingerprint capturing system as an executive body.

In the embodiment of the present application, the fingerprint capturing system may acquire fingerprint information of a user captured by the multiple fingerprint sensors, and determine an effectively pressed fingerprint sensor among the multiple fingerprint sensors according to the fingerprint information of the user; and in this way, during fingerprint identification, a fingerprint identification unit only needs to perform fingerprint matching according to the fingerprint information captured by the effectively pressed fingerprint sensor, which is beneficial to improving speed of fingerprint identification.

That is, in the embodiment of the present application, the fingerprint identification unit only needs to perform fingerprint matching according to the fingerprint information captured by the effectively pressed fingerprint sensor instead of fingerprint information captured by all fingerprint sensors, which could reduce matching time, improve matching speed, and improve user experience.

Optionally, in the embodiment of the present application, the fingerprint capturing system may include the fingerprint identification unit, or may not include the fingerprint identification unit. If the fingerprint capturing system does not include the fingerprint identification unit, the fingerprint capturing system may only send the fingerprint information of the user captured by the effectively pressed fingerprint sensor to the fingerprint identification unit, so that the fingerprint identification unit may perform a subsequent fingerprint identification operation.

As an embodiment, a processing unit in the fingerprint capturing system is an MCU in a fingerprint module, and the fingerprint identification unit may be a processor of an electronic device, and in this way, after the MCU determines the effectively pressed fingerprint sensor among the multiple fingerprint sensors, the MCU may upload the fingerprint information captured by the effectively pressed fingerprint sensor to the processor of the electronic device, so as to facilitate the processor of the electronic device to perform subsequent fingerprint identification and other operations. Specifically, the MCU may only upload the fingerprint information captured by the effectively pressed fingerprint sensor to the processor of the electronic device, instead of uploading the fingerprint information captured by all the fingerprint sensors, so that the processor of the electronic device only needs to perform fingerprint matching according to the fingerprint information captured by the effectively pressed fingerprint sensor, and does not need to match the fingerprint information captured by all the fingerprint sensors, which is beneficial to reducing matching time, improving speed of fingerprint identification and further improving user experience.

Optionally, if the number of effectively pressed fingerprint sensors is equal to zero, the MCU may not send the fingerprint information of the user to the processor of the electronic device, which is beneficial to avoiding fingerprint identification caused by misoperation of the user.

As another embodiment, the fingerprint identification unit may also be an MCU. After the MCU determines the effectively pressed fingerprint sensor, the MCU may further perform subsequent fingerprint identification and other operations according to the fingerprint information captured by the effectively pressed fingerprint sensor.

As yet another embodiment, the processing unit in the fingerprint capturing system is a processor of an electronic device, and the processor may acquire fingerprint information captured by multiple fingerprint sensors, and further, may determine an effectively pressed fingerprint sensor among the multiple fingerprint sensors according to the fingerprint information captured by the multiple fingerprint sensors, so that the processor of the electronic device may perform subsequent fingerprint identification and other operations according to the fingerprint information captured by the effectively pressed fingerprint sensor, which is beneficial to improving the speed of the fingerprint identification.

Optionally, in some embodiments, the S220 specifically includes:

determining a pressing region for the user on the sensing region of the each fingerprint sensor of the multiple fingerprint sensors according to the fingerprint information of the user; and determining the effectively pressed fingerprint sensor among the multiple fingerprint sensors according to the pressing region for the user on the sensing region of the each fingerprint sensor.

It can be seen from the foregoing description that the fingerprint sensor is a sensing array (or pixel array) composed of multiple sensing units, and each pixel point in the pixel array may collect a light signal reflected from the display screen. If the pixel point is pressed, the reflected light signal generally reaches the pixel point, on the contrary, a sampling value of the pixel point is usually small, and thus the sampling value of the pixel point may reflect whether a region where the pixel point is located is pressed. Therefore, the fingerprint capturing system may determine the pressing region on the sensing region of the each fingerprint sensor according to the sampling value of the pixel point of the each fingerprint sensor.

Generally speaking, the sampling value of the pressed pixel point is larger, therefore, a difference between a pixel point and an adjacent pixel point may be compared to determine whether the pixel point is pressed, or a sampling threshold may be preset, a pixel point may be considered to be pressed if the pixel point having a sampling value greater than the sampling threshold, and the sampling threshold may be determined by capturing pressing information of a large number of fingers.

Optionally, as an embodiment, the fingerprint capturing system may compare the magnitude of the sampling value of each pixel point in the fingerprint information of the user, and determine the pressing region on the sensing region of the each fingerprint sensor according to the magnitude of the sampling value of the each pixel point, for example, the fingerprint capturing system may determine a region formed by pixel points with a sampling value greater than a first sampling threshold in the each fingerprint sensor as the pressing region for the user on the sensing region of the each fingerprint sensor.

Optionally, as another embodiment, the fingerprint capturing system may determine a variance of the sampling values of each pixel point in the fingerprint information of the user, and determine the pressing region on the sensing region of the each fingerprint sensor according to the variance of the sampling values of the each pixel point. For example, the fingerprint capturing system may determine a region formed by pixel points with a variance greater than a first variance threshold in the each fingerprint sensor as the pressing region for the user on the sensing region of the each fingerprint sensor.

Further, the fingerprint capturing system may determine the effectively pressed fingerprint sensor according to a size of the pressing region on the sensing region of the each fingerprint sensor. For example, the fingerprint capturing system may determine a fingerprint sensor having an area of a pressing region larger than a first threshold (for example, 50% of the area of the sensing region of the fingerprint sensor) to be effectively pressed, or the fingerprint capturing system may also determine K fingerprint sensor(s) corresponding to K largest pressing region(s) as the effectively pressed fingerprint sensor(s).

For example, as shown in FIG. 3, the multiple fingerprint sensors may include six fingerprint sensors, denoted as S1 to S6, and the fingerprint sensors S3 and S6 may be determined to be effectively pressed according to sizes of the pressing regions on the sensing regions of the six fingerprint sensors.

Optionally, in some embodiments, the method 200 further includes:

determining a number threshold of the effectively pressed fingerprint sensor according to a security level of a first operation of triggering fingerprint capturing and a first correspondence relationship, where the first correspondence relationship is a correspondence relationship between a security level and a number threshold of the effectively pressed fingerprint sensor.

It should be understood that, in the embodiment of the present application, the first operation of triggering fingerprint capturing may be an screen off unlock operation of a terminal, or an operation of accessing an application, or a payment operation, or other operations that require fingerprint authentication, which is not limited in the embodiment of the present application.

In the embodiment of the present application, a security level corresponding to an operation may be set. For example, the screen off unlock operation may be set as a low security level, the payment operation may be set as a high security level, and the access of a non-payment application may be set as a medium security level. Further, different number thresholds of the effectively pressed sensor may be configured for different security levels, that is, a first correspondence relationship is determined. Herein, a number threshold of the effectively pressed sensor corresponding to each security level may be understood as a maximum number of the fingerprint sensors that captures fingerprint information to be uploaded under this security level. By configuring different number thresholds for different security levels, it is beneficial to flexibly adjust a length of fingerprint information uploaded under different security levels, that is, a password length, so that both speed and security of fingerprint identification can be taken into account.

For example, a lower number threshold may be configured for a low security level and a higher number threshold may be configured for a high security level, and in this way fingerprint information captured by a small number of fingerprint sensors may be uploaded for fingerprint capturing triggered by an operation at a low security level (such as an screen off unlock operation), so that only fingerprint information with a shorter length needs to be matched during fingerprint matching, which could increase speed of fingerprint identification; and fingerprint information captured by a large number of fingerprint sensors may be uploaded for fingerprint capturing triggered by an operation at a high security level (such as a payment operation), which could increase a length of fingerprint information, that is, a length of password, and further improve security of fingerprint identification.

That is, in the embodiment of the present application, different security levels may correspond to different number thresholds of an effectively pressed fingerprint sensor. The fingerprint capturing system may determine a number threshold of an effectively pressed fingerprint sensor according to a security level of the current operation. Further, the effectively pressed fingerprint sensor may be determined according to the size of the pressing region on the sensing region of the each fingerprint sensor in combination with the number threshold.

Optionally, if the number threshold of the effectively pressed fingerprint sensor corresponding to the security level of the first operation of triggering fingerprint capturing is K in the first correspondence relationship, where K is a positive integer, in one embodiment, the fingerprint capturing system may first determine K largest pressing region(s) among multiple pressing regions, then determine a pressing region having an area larger than a second threshold (for example, 30% of the area of the sensing region of the fingerprint sensor) in the K pressing region(s). Assuming that there are L pressing region(s), where L is a positive integer, the fingerprint capturing system may further determine L fingerprint sensor(s) corresponding to the L pressing region(s) as the effectively pressed fingerprint sensor(s).

In another embodiment, the fingerprint capturing system may first determine P pressing region(s) having an area larger than a second threshold (for example, 30% of the area of the sensing region of the fingerprint sensor) among multiple pressing regions. If P is greater than K, the fingerprint capturing system may determine K largest pressing region(s) in the P pressing regions, and may further determine fingerprint sensor(s) corresponding to the K pressing region(s) as effectively pressed fingerprint sensor(s); or if P is less than or equal to K, the fingerprint capturing system may directly determine fingerprint sensor(s) corresponding to the P pressing region(s) as the effectively pressed fingerprint sensor(s).

It should be understood that a security level corresponding to each operation may be set by the system or may be set by the user, for example, the user may set the security level by operating a setting interface of a terminal device or a setting interface of an application; similarly, the user may also set the number threshold of the effectively pressed sensor corresponding to each security level by operating a setting interface of a terminal device or a setting interface of an application.

In some optional implementation manners, the number threshold of the effectively pressed fingerprint sensor corresponding to the low security level may be determined according to the number of fingerprint sensors against which a single finger is able to be pressed, and the number threshold of the effectively pressed fingerprint sensor corresponding to the high security level may be determined according to the number of fingerprint sensors against which at least two fingers are able to be pressed.

In other words, for an operation at the low security level, fingerprint information of a single finger may be uploaded, so that fingerprint identification may be performed according to the fingerprint information of the single finger, which is beneficial to improving speed of fingerprint identification and reducing power consumption of a terminal device; and for an operation at the high security level, fingerprint information of at least two fingers may be uploaded, so that fingerprint identification may be performed according to the fingerprint information of the at least two fingers, which is beneficial to improving security of fingerprint identification. Therefore, according to a specific application scenario, a fingerprint identification strategy is determined, which is beneficial to taking into account of both power consumption of a terminal device and security of fingerprint identification.

In a specific implementation, the number threshold of the effectively pressed fingerprint sensor corresponding to each security level may be determined as follows.

Figure 4:
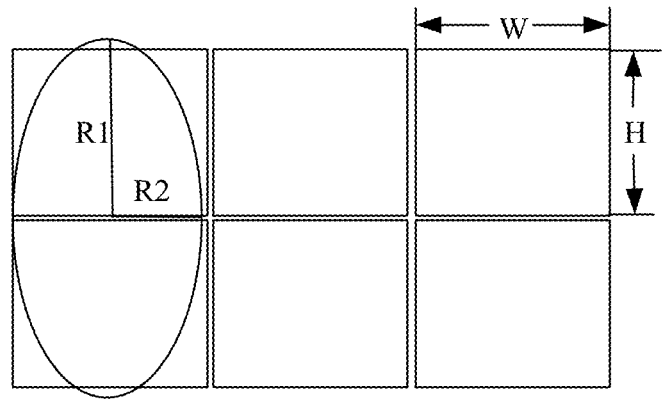
FIG. 4 is a schematic diagram of an example of determining a number threshold of an effectively pressed fingerprint sensor.

As shown in FIG. 4, assuming that a size of a sensing region of a single fingerprint sensor is W*H, a pressing region for a user on a display screen is generally circular or oval, assuming that a long axis of the pressing region is R1 and a short axis thereof is R2, where R1 and R2 may be obtained by trials on sizes of pressing regions of a large number of fingers on the display screen, it can be determined that the number of fingerprint sensors against which a single finger is able to be pressed is approximately P=[(R1*R2)/(W*H)], where [ ] represents rounding. Optionally, it can be determined that the number threshold of the effectively pressed fingerprint sensor corresponding to the low security level is P, P+1, or P−1, and the number threshold of the effectively pressed fingerprint sensor corresponding to the high security level is 2P, 2P−1 or 3P, 3P−1, or the like, that is, the higher the security level is, the more the number of the fingerprint sensors capable of being uploaded are, which is beneficial to taking into account of both speed and security of fingerprint identification.

Figure 5:
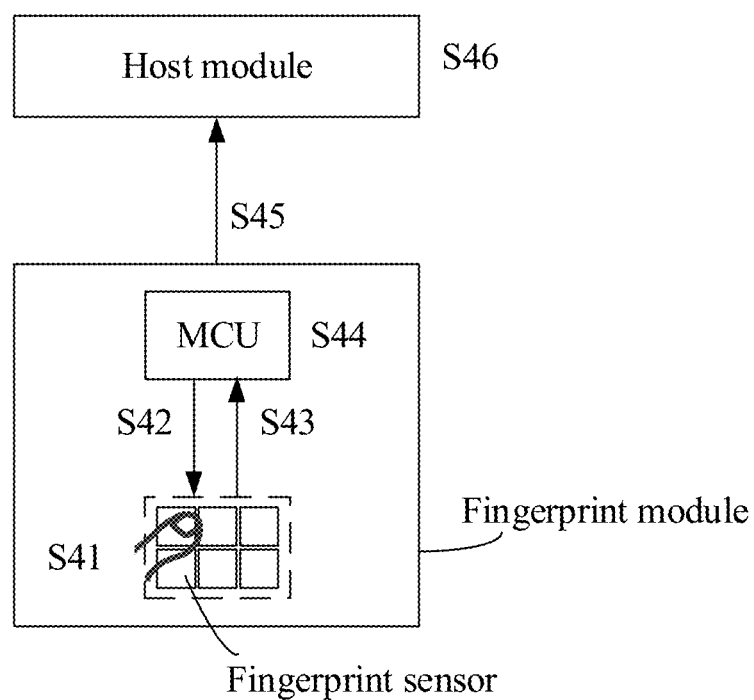
FIG. 5 is a flowchart of an under-screen fingerprint capturing method according to another embodiment of the present application.

A flow of an under-screen fingerprint capturing method according to an embodiment of the present application will be described in detail below with reference to a specific example shown in FIG. 5. As shown in FIG. 5, the under-screen fingerprint capturing method may include the following steps:

S41, pressing, by a user, a sensing region of a fingerprint module on a display screen;

S42, turning on multiple fingerprint sensors in a fingerprint apparatus, and capturing fingerprint information of the user through the multiple fingerprint sensors;

S43, sending, by the multiple fingerprint sensors, captured fingerprint information of the user to an MCU in the fingerprint module;

S44, determining, by the MCU in the fingerprint module, an effectively pressed fingerprint sensor among the multiple fingerprint sensors according to the fingerprint information of the user;

S45, uploading, by the MCU in the fingerprint module, the fingerprint information of the user captured by the effectively pressed fingerprint sensor to a processor of an electronic device, which may specifically be a host module of the electronic device; and S46, performing, by the processor of the electronic device, an operation such as fingerprint identification or fingerprint registration according to the fingerprint information of the user captured by the effectively pressed fingerprint sensor.

It should be understood that in the embodiment of the present application, the S42 may be executed by a fingerprint control module of a fingerprint module, and the fingerprint control module may be an MCU in a fingerprint apparatus or a processor of an electronic device, such as a host module of a terminal device, which is not limited in the embodiment of the present application.

Method embodiments of the present application are described in detail with reference to FIGS. 2 to 5 above, and apparatus embodiments of the present application are described in detail with reference to FIGS. 6 to 7 below. It should be understood that, the apparatus embodiments correspond to the method embodiments, and similar description may refer to the method embodiments.

Figure 6:
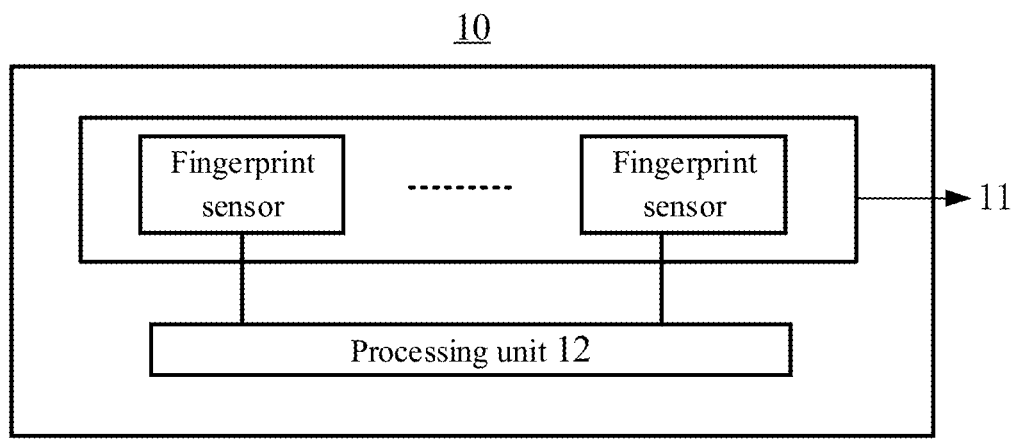
FIG. 6 is a schematic block diagram of an under-screen fingerprint capturing system according to an embodiment of the present application.

FIG. 6 is a schematic structural diagram of an under-screen fingerprint capturing system according to an embodiment of the present application. As shown in FIG. 6, the under-screen fingerprint capturing system 10 includes:

multiple fingerprint sensors 11, configured to capture fingerprint information of a user, where each fingerprint sensor corresponds to a sensing region, and sensing regions corresponding to the multiple fingerprint sensors form a fingerprint capturing region of the under-screen fingerprint capturing system; and a processing unit 12, configured to acquire the fingerprint information of the user captured by the multiple fingerprint sensors, and determine an effectively pressed fingerprint sensor among the multiple fingerprint sensors according to the fingerprint information of the user, where the fingerprint information of the user captured by the effectively pressed fingerprint sensor is used for fingerprint authentication of the user.

Optionally, in some embodiments, the processing unit 12 is configured to:

determine a pressing region for the user on the sensing region of the each fingerprint sensor of the multiple fingerprint sensors according to the fingerprint information of the user; and determine the effectively pressed fingerprint sensor among the multiple fingerprint sensors according to the pressing region for the user on the sensing region of the each fingerprint sensor.

Optionally, in some embodiments, the processing unit 12 is further configured to:

determine a variance of sampling values of each pixel point or a magnitude of a sampling value of each pixel point in the fingerprint information of the user; and determine the pressing region on the sensing region of the each fingerprint sensor according to the variance of the sampling values of the each pixel point or the magnitude of the sampling value of the each pixel point.

Optionally, in some embodiments, the processing unit 12 is further configured to:

determine a region formed by pixel points with a variance greater than a first variance threshold in the each fingerprint sensor as the pressing region for the user on the sensing region of the each fingerprint sensor; or determine a region formed by pixel points with a sampling value greater than a first sampling threshold in the each fingerprint sensor as the pressing region for the user on the sensing region of the each fingerprint sensor.

Optionally, in some embodiments, the processing unit 12 is further configured to:

determine a fingerprint sensor corresponding to a pressing region having an area larger than a first threshold in the pressing regions on the sensing regions of the fingerprint sensors as the effectively pressed fingerprint sensor.

Optionally, in some embodiments, the processing unit 12 is further configured to:

determine a number threshold of the effectively pressed fingerprint sensor according to a security level of a first operation of triggering fingerprint capturing and a first correspondence relationship, where the first correspondence relationship is a correspondence relationship between a security level and a number threshold of the effectively pressed fingerprint sensor.

Optionally, in some embodiments, the processing unit 12 is further configured to:

determine the effectively pressed fingerprint sensor among the multiple fingerprint sensors according to the pressing region for the user on the sensing region of the fingerprint sensors in combination with the number threshold of the effectively pressed fingerprint sensor.

Optionally, in some embodiments, the processing unit 12 is further configured to:

determine K largest pressing region(s) in the pressing regions on the sensing regions of the fingerprint sensors, where K is the number threshold of the effectively pressed fingerprint sensor corresponding to the security level of the first operation;

determine L pressing region(s) having an area larger than a second threshold in the K pressing region(s), where L is a positive integer and L is less than or equal to K; and determine L fingerprint sensor(s) corresponding to the L pressing region(s) as the effectively pressed fingerprint sensor(s).

Optionally, in some embodiments, in the first correspondence relationship, a first security level corresponds to N fingerprint sensors, a second security level corresponds to M fingerprint sensor(s), and the first security level is higher than the second security level, where N and M are positive integers, and N is greater than M.

Optionally, in some embodiments, M is a number of fingerprint sensors against which a single finger is able to be pressed, and N is a number of fingerprint sensors against which at least two fingers are able to be pressed.

Optionally, in some embodiments, the processing unit 12 is further configured to: perform fingerprint authentication according to the fingerprint information of the user captured by the effectively pressed fingerprint sensor.

Optionally, in some embodiments, the processing unit 12 is a micro control unit (MCU) in a fingerprint module or a processor in an electronic device.

Optionally, in some embodiments, the processing unit 12 is the MCU in the fingerprint module, and the processing unit 12 is further configured to send the fingerprint information of the user captured by the effectively pressed fingerprint sensor to the processor of the electronic device.

Specifically, the processing unit 12 may be used to perform related operations performed by the fingerprint capturing system in the foregoing method embodiments, which will not be repeated redundantly herein for the sake of brevity.

Figure 7:
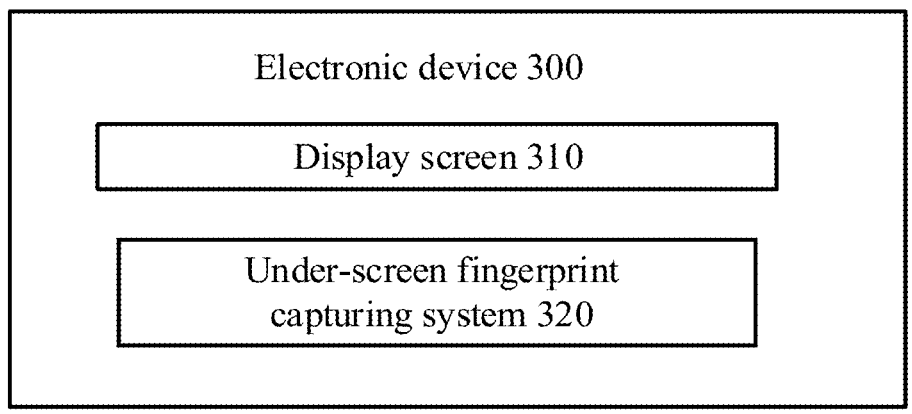
FIG. 7 is a schematic block diagram of an electronic device according to an embodiment of the present application.

FIG. 7 is a schematic structural diagram of an electronic device according to an embodiment of the present application. As shown in FIG. 7, the electronic device 300 includes: a display screen 310 and an under-screen fingerprint capturing system 320, where the under-screen fingerprint capturing system 320 may correspond to the under-screen fingerprint capturing system 10 in the foregoing embodiment, and may be used to perform related operations of the fingerprint capturing system in the method embodiments, which will not be repeated redundantly herein for the sake of brevity.

It should be understood that the number, size, and arrangement of the fingerprint sensors shown in the embodiment of the present application are only examples, and can be adjusted according to actual needs, which is not limited in the embodiment of the present application. For example, the number of the multiple fingerprint sensors may be two, three, four or five, etc. The multiple fingerprint sensors may be rectangularly distributed, circularly distributed, or the like.

It should be understood that the processor or the processing unit of the embodiment of the present application may be an integrated circuit chip with signal processing capability. In an implementation process, steps of the foregoing method embodiments may be completed by using an integrated logical circuit of hardware in the processor or an instruction in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and the logical block diagrams disclosed in the embodiments of the present application can be implemented or executed. The general purpose processor may be a microprocessor or the processor may be any conventional processor or the like. Steps of the methods disclosed in the embodiments of the present application may be directly executed and completed by using a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the steps of the foregoing method in combination with hardware of the processor.

It can be appreciated that, a terminal or an electronic device in an embodiment of the present application may further include a memory, and the memory may be either volatile memory or nonvolatile memory, or may include both volatile and nonvolatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM) and used as an external cache. By way of example and not limitation, RAMs of many forms are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the system and method described in this specification aims to include but is not limited to these memories and any memory of another proper type.

An embodiment of the present application further provides a computer readable storage medium, where the computer readable storage medium stores one or more programs, and the one or more programs include an instruction. When the instruction is executed by a portable electronic device that includes a plurality of application programs, the portable electronic device can execute the method in the embodiments shown in FIG. 2 to FIG. 5.

An embodiment of the present application further provides a computer program including instructions that, when executed by a computer, cause the computer to execute the method of the embodiments shown in FIG. 2 to FIG. 5.

An embodiment of the present application further provides a chip including an input and output interface, at least one processor, at least one memory and a bus, where the at least one memory is configured to store an instruction, the at least one processor is configured to call an instruction in the at least one memory to execute the method of the embodiments shown in FIG. 2 to FIG. 5.

It should be understood that, in various embodiments of the present application, values of sequence numbers of the above-mentioned various processes do not mean an order of execution which should be determined based upon functionalities and internal logics thereof, rather than setting any limitation to implementation of the embodiments of the present application.

Those of ordinary skill in the art may be aware that, units and algorithm steps of the examples described in the embodiments disclosed in this paper may be implemented by electronic hardware, or a combination of computer software and the electronic hardware. Whether these functions are executed in hardware or software mode depends on the specific applications and design constraint conditions of the technical solution. Those skilled in the art may implement the described functions by using different methods for each specific application, but this implementation should not be considered to be beyond the scope of the present application.

Those skilled in the art to which the present disclosure pertains may clearly understand that, for convenience and simplicity of description, the specific working processes of the system, the apparatus and the units described above may refer to corresponding processes in the foregoing method embodiments, and will not be repeated redundantly herein.

In the several embodiments provided in the present application, it should be understood that the disclosed system, apparatus, and method may be implemented in another manner. For example, the described apparatus embodiment is merely an example. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate components may or may not be physically separate, and components displayed as units may or may not be physical units, may be located in one position, or may be distributed on multiple network units. Part of or all of the units here may be selected according to actual needs to achieve the objectives of the solutions of the embodiments of the present application.

In addition, functional units in the embodiments of the present application may be integrated into one processing unit, or each of the units may exist alone physically, or two or more units are integrated into one unit.

When implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present application, but the protection scope of the present application is not limited thereto, persons skilled in the art who are familiar with the art could readily think of variations or substitutions within the technical scope disclosed by the present application, and these variations or substitutions shall fall within the protection scope of the present application. Therefore, the protection scope of this application shall be subject to the protection scope of the claims.

What is claimed is:

1. A multi-sensor-based under-screen fingerprint capturing method, applied to an under-screen fingerprint capturing system comprising multiple fingerprint sensors, wherein the method comprises:

acquiring fingerprint information of a user captured by the multiple fingerprint sensors, wherein each fingerprint sensor corresponds to a sensing region, and sensing regions corresponding to the multiple fingerprint sensors form a fingerprint capturing region of the under-screen fingerprint capturing system;

determining a pressing region for the user on the sensing region of the each fingerprint sensor of the multiple fingerprint sensors according to the fingerprint information of the user; and determining an effectively pressed fingerprint sensor among the multiple fingerprint sensors according to the pressing region for the user on the sensing region of the each fingerprint sensor comprises:

determining a fingerprint sensor corresponding to a pressing region having an area larger than a first threshold in the pressing regions on the sensing regions of the fingerprint sensors as the effectively pressed fingerprint sensor, wherein the fingerprint information of the user captured by the effectively pressed fingerprint sensor is used for fingerprint authentication of the user.

2. The method according to claim 1, wherein the determining the pressing region for the user on the sensing region of the each fingerprint sensor of the multiple fingerprint sensors according to the fingerprint information of the user comprises:

determining a variance of sampling values of each pixel point or a magnitude of a sampling value of each pixel point in the fingerprint information of the user; and determining the pressing region on the sensing region of the each fingerprint sensor according to the variance of the sampling values of the each pixel point or the magnitude of the sampling value of the each pixel point.

3. The method according to claim 2, wherein the determining the pressing region on the sensing region of the each fingerprint sensor according to the variance of the sampling values of the each pixel point or the magnitude of the sampling value of the each pixel point comprises:

determining a region formed by pixel points with a variance greater than a first variance threshold in the each fingerprint sensor as the pressing region for the user on the sensing region of the each fingerprint sensor; or determining a region formed by pixel points with a sampling value greater than a first sampling threshold in the each fingerprint sensor as the pressing region for the user on the sensing region of the each fingerprint sensor.

4. The method according to claim 1, wherein the method further comprises:

determining a number threshold of the effectively pressed fingerprint sensor according to a security level of a first operation of triggering fingerprint capturing and a first correspondence relationship, wherein the first correspondence relationship is a correspondence relationship between a security level and a number threshold of the effectively pressed fingerprint sensor.

5. The method according to claim 4, wherein the determining the effectively pressed fingerprint sensor among the multiple fingerprint sensors according to the pressing region for the user on the sensing region of the each fingerprint sensor comprises:

determining the effectively pressed fingerprint sensor among the multiple fingerprint sensors according to the pressing region for the user on the sensing region of the each fingerprint sensor in combination with the number threshold of the effectively pressed fingerprint sensor.

6. The method according to claim 5, wherein the determining the effectively pressed fingerprint sensor among the multiple fingerprint sensors according to the pressing region for the user on the sensing region of the each fingerprint sensor in combination with the number threshold of the effectively pressed fingerprint sensor comprises:

determining K largest pressing region(s) in the pressing regions on the sensing regions of the fingerprint sensors, wherein K is the number threshold of the effectively pressed fingerprint sensor corresponding to the security level of the first operation;

determining L pressing region(s) having an area larger than a second threshold in the K pressing region(s), wherein L is a positive integer and L is less than or equal to K; and determining L fingerprint sensor(s) corresponding to the L pressing region(s) as the effectively pressed fingerprint sensor(s).

7. The method according to claim 4, wherein in the first correspondence relationship, a first security level corresponds to N fingerprint sensors, a second security level corresponds to M fingerprint sensor(s), and the first security level is higher than the second security level, wherein N and M are positive integers, and N is greater than M.

8. The method according to claim 1, wherein the method further comprises:

sending the fingerprint information of the user captured by the effectively pressed fingerprint sensor to a processor of an electronic device, if a number of the effectively pressed fingerprint sensors is greater than zero.

9. A multi-sensor-based under-screen fingerprint capturing system, comprising:

multiple fingerprint sensors, configured to capture fingerprint information of a user, wherein each fingerprint sensor corresponds to a sensing region, and sensing regions corresponding to the multiple fingerprint sensors form a fingerprint capturing region of the under-screen fingerprint capturing system; and a processing unit, configured to determine a pressing region for the user on the sensing region of the each fingerprint sensor of the multiple fingerprint sensors according to the fingerprint information of the user; and determine an effectively pressed fingerprint sensor among the multiple fingerprint sensors according to the pressing region for the user on the sensing region of the each fingerprint sensor, wherein the fingerprint information of the user captured by the effectively pressed fingerprint sensor is used for fingerprint authentication of the user;

wherein the processing unit is further configured to determine a fingerprint sensor corresponding to a pressing region having an area larger than a first threshold in the pressing regions on the sensing regions of the fingerprint sensors as the effectively pressed fingerprint sensor.

10. The under-screen fingerprint capturing system according to claim 9, wherein the processing unit is further configured to:

determine a variance of sampling values of each pixel point or a magnitude of a sampling value of each pixel point in the fingerprint information of the user; and determine the pressing region on the sensing region of the each fingerprint sensor according to the variance of the sampling values of the each pixel point or the magnitude of the sampling value of the each pixel point.

11. The under-screen fingerprint capturing system according to claim 10, wherein the processing unit is further configured to:

determine a region formed by pixel points with a variance greater than a first variance threshold in the each fingerprint sensor as the pressing region for the user on the sensing region of the each fingerprint sensor; or determine a region formed by pixel points with a sampling value greater than a first sampling threshold in the each fingerprint sensor as the pressing region for the user on the sensing region of the each fingerprint sensor.

12. The under-screen fingerprint capturing system according to claim 9, wherein the processing unit is further configured to:

determine a number threshold of the effectively pressed fingerprint sensor according to a security level of a first operation of triggering fingerprint capturing and a first correspondence relationship, wherein the first correspondence relationship is a correspondence relationship between a security level and a number threshold of the effectively pressed fingerprint sensor.

13. The under-screen fingerprint capturing system according to claim 12, wherein the processing unit is further configured to:
    determine the effectively pressed fingerprint sensor among the multiple fingerprint sensors according to the pressing region for the user on the sensing region of the each fingerprint sensor in combination with the number threshold of the effectively pressed fingerprint sensor.

14. The under-screen fingerprint capturing system according to claim 13, wherein the processing unit is further configured to determine K largest pressing region(s) in the pressing regions on the sensing regions of the fingerprint sensors, wherein K is the number threshold of the effectively pressed fingerprint sensor corresponding to the security level of the first operation;
    determine L pressing region(s) having an area larger than a second threshold in the K pressing region(s), wherein L is a positive integer and L is less than or equal to K; and
    determine L fingerprint sensor(s) corresponding to the L pressing region(s) as the effectively pressed fingerprint sensor(s).

15. The under-screen fingerprint capturing system according to claim 12, wherein in the first correspondence relationship, a first security level corresponds to N fingerprint sensors, a second security level corresponds to M fingerprint sensor(s), and the first security level is higher than the second security level, wherein N and M are positive integers, and N is greater than M.

16. The under-screen fingerprint capturing system according to claim 9, wherein the processing unit is a micro control unit (MCU) in a fingerprint module or a processor in an electronic device.

17. The under-screen fingerprint capturing system according to claim 16, wherein the processing unit is the MCU in the fingerprint module, and the processing unit is further configured to send the fingerprint information of the user captured by the effectively pressed fingerprint sensor to the processor of the electronic device.

18. An electronic device, comprising an under-screen fingerprint capturing system, wherein the under-screen fingerprint capturing system comprises:
    multiple fingerprint sensors, configured to capture fingerprint information of a user, wherein each fingerprint sensor corresponds to a sensing region, and sensing regions corresponding to the multiple fingerprint sensors form a fingerprint capturing region of the under-screen fingerprint capturing system; and
    a processing unit, configured to acquire the fingerprint information of the user captured by the multiple fingerprint sensors, and determine an effectively pressed fingerprint sensor among the multiple fingerprint sensors according to the fingerprint information of the user, wherein the fingerprint information of the user captured by the effectively pressed fingerprint sensor is used for fingerprint authentication of the user;
    wherein the processing unit is further configured to determine a fingerprint sensor corresponding to a pressing region having an area larger than a first threshold in the pressing regions on the sensing regions of the fingerprint sensors as the effectively pressed fingerprint sensor.

* * * * *